United States Patent Office 3,026,180
Patented Mar. 20, 1962

3,026,180
PROCESS FOR THE PRODUCTION OF HYDROGEN PEROXIDE FROM ALKYLANTHRAQUINONES
Tommaso Cubeddu, Milan, Italy, assignor to Montecatini Societa Generale per l'Industria Mineraria e Chimica, Milan, Italy, a corporation of Italy
No Drawing. Filed June 11, 1958, Ser. No. 741,228
Claims priority, application Italy July 12, 1957
13 Claims. (Cl. 23—207)

This invention relates to a process comprising reducing alkylanthraquinones to the hydroquinonic form and thereafter oxidizing the latter to the quinonic form to produce hydrogen peroxide. It particularly relates to the use of an advantageous class of solvents in either the reduction step or the oxidation step, and preferably in both.

Generally, the patents relating to the production of hydrogen peroxide by alternate reduction and oxidation of alkylanthraquinones, while dissolved in suitable solvents, stress the use of solvent mixtures one component of which is a specific solvent for the quinonic form whereas the other component is a specific solvent for the hydroquinonic form. The components are contained in the mixture in variable proportions, depending upon the solvent power thereof for one of the said two forms. These mixtures usually contain a higher proportion of the specific solvent for the hydroquinonic form than of the solvent for the quinonic form, since the hydroquinonic form generally has a markedly lower solubility. This necessarily results in a substantial limitation of the amount of hydrogen peroxide obtainable. The highest proportion of hydroquinonic form which can be kept in solution by the given amount of specific solvent governs the amount of hydrogen peroxide obtainable.

Moreover, it is difficult to maintain the ratios of concentration of the two solvents constant over a period of time.

It has now been found that alternate reduction and oxidation of alkylanthraquinones to obtain hydrogen peroxide can advantageously be carried out by employing an alkyl ester of benzoic acid as solvent. Such solvents are unique here, since they dissolve both the quinonic form and the hydroquinonic form. Ethyl benzoate is preferred.

By using a solvent of this type it is possible to utilize the dissolving power for both forms of the alkylanthraquinone most advantageously. Since the highest amount of the same solvent is always available for both forms, the solvent is always available in the process. The solvent has a high solvent power in comparison with other solvents or mixtures of solvents which are described in the prior patents. The present invention results in high concentrations of hydrogen peroxide, and has a marked advantage in this respect over the other solvent mixtures of the prior art.

The alkylester of benzoic acid can be used in admixture with other specific solvents either for the quinonic or for the hydroquinonic form. Thus the process can be modified to accommodate it to the characteristics of the particular alkylanthraquinone utilized, or to the special working conditions employed.

The following examples are illustrative, and are not intended as limitative. Other alkylanthraquinones can be utilized.

*Example 1*

20 g. 2-ethylanthraquinone are dissolved in 100 cc. ethyl benzoate, thus obtaining 116 cc. of solution. The solution is hydrogenated in the presence of Raney nickel with 1242 cc. hydrogen, calculated at 0° C. and 760 mm. Hg.

Upon oxidation of the solution and subsequent extraction thereof with water, 1.86 g. $H_2O_2$ are obtained. Therefore there is a concentration of 16 g. $H_2O_2$ per liter in the organic solution.

The yield of $H_2O_2$ calculated on the basis of introduced hydrogen appears to be 98%.

*Example 2*

15 g. 2-ethylanthraquinone are dissolved in 100 cc. isobutyl benzoate, thus obtaining 112 cc. of solution which is hydrogenated in the presence of Raney nickel with 1000 cc. hydrogen, calculated at 0° C. and 760 mm. Hg.

After oxidation of the solution and subsequent extraction thereof with water 1.45 g. $H_2O_2$ are obtained, with a yield of 96% calculated on the basis of introduced hydrogen.

*Example 3*

15 g. 2-ethylanthraquinone are dissolved in a mixture consisting of 30 cc. dibutylether of diethylene glycol and 70 cc. ethyl benzoate thus obtaining 110 cc. of a solution which is hydrogenated in the presence of Raney nickel with 1000 cc. hydrogen, calculated at 0° C. and 760 mm. Hg, without observing any precipitation of ethylanthrahydroquinone. The catalyst is separated. Thereafter, operating with oxygen or air, the solution is wholly oxidized and the hydrogen peroxide obtained is extracted with water.

The hydrogen peroxide thus recovered amounts to 1.6 g. This is 95.25% of the theoretical yield calculated on the basis of hydrogen used.

The corresponding ether of ethylene glycol can be used instead.

*Example 4*

In a mixture consisting of 15 cc. alpha-methyl-naphthalene and 85 cc. ethylbenzoate there are dissolved 25 g. 2-ethylanthraquinone, thus obtaining 121 cc. of a solution which is hydrogenated in the presence of Raney nickel with 1240 cc. hydrogen, calculated at 0° C. and 760 mm. Hg.

After oxidation of the solution and subsequent extraction with water, 1.85 g. $H_2O_2$ are obtained with a yield of 97.6% calculated on the introduced hydrogen.

*Example 5*

In a mixture consisting of 30 cc. alpha-methylnaphthalene and 70 cc. isobutyl benzoate there are dissolved 20 g. 2-ethylanthraquinone, thus obtaining 116 cc. of a solution which is hydrogenated in the presence of Raney nickel with 1100 cc. hydrogen, calculated at 0° C. and 760 mm. Hg.

After oxidation of the solution and subsequent extraction with water, 1.61 g. $H_2O_2$ are obtained with a yield of 96% calculated on the introduced hydrogen.

I claim:

1. In the production of hydrogen peroxide by alternate hydrogenation and oxidation of a lower alkylanthraquinone to the hydroquinonic and the quinonic forms, the improvement comprising carrying out the hydrogenation and the oxidation in a liquid medium comprising an alkyl ester of benzoic acid, the alkyl group of the ester having no more than eight carbon atoms, and subsequent to said oxidation removing hydrogen peroxide by extraction with water.

2. In the production of hydrogen peroxide by alternate hydrogenation and oxidation of a lower alkylanthraquinone to the hydroquinonic and the quinonic forms, the improvement comprising carrying out the hydrogenation and the oxidation in ethyl benzoate, and subsequent to said oxidation removing hydrogen peroxide by extraction with water.

3. In the production of hydrogen peroxide by alternate hydrogenation and oxidation of a lower alkylanthraquinone to the hydroquinonic and the quinonic forms, the improvement comprising carrying out the hydrogenation and the oxidation in isobutyl benzoate.

4. In the production of hydrogen peroxide by alternate hydrogenation and oxidation of an alkylanthraquinone to the hydroquinonic and the quinonic forms, the improvement comprising carrying out the hydrogenation and the oxidation in a liquid medium comprising an alkyl ester of benzoic acid, the alkyl group of the alkylanthraquinone and the alkyl group of the ester having no more than eight carbon atoms.

5. The process of claim 1, the alkyl ester of benzoic acid being used in admixture with alpha-methyl-naphthalene.

6. The process of claim 1, the alkyl ester of benzoic acid being used in admixture with a dialkyl ether of ethylene glycol.

7. The process of claim 1, the alkyl ester of benzoic acid being used in admixture with a dialkyl ether of diethylene glycol.

8. A method of preparing hydrogen peroxide which comprises dissolving 2-ethylanthraquinone in ethyl benzoate, hydrogenating with hydrogen to 2-ethylanthrahydroquinone, oxidizing by contacting oxygen-containing gas with said 2-ethylanthrahydroquinone dissolved in said ethyl benzoate, and then extracting the hydrogen peroxide, produced in the oxidation, with water.

9. A method of preparing hydrogen peroxide which comprises dissolving 2-ethylanthraquinone in ethyl benzoate, hydrogenating with hydrogen to 2-ethylanthrahydroquinone, oxidizing by contacting oxygen-containing gas with said 2-ethylanthrahydroquinone dissolved in said ethyl benzoate, and then extracting the hydrogen peroxide, produced in the oxidation, with water, the ethyl benzoate being employed in admixture with a minor amount, by volume, with respect to the benzoate, of alpha-methyl-naphthalene.

10. A method of preparing hydrogen peroxide which comprises dissolving 2-ethylanthraquinone in ethyl benzoate, hydrogenating with hydrogen to 2-ethylanthrahydroquinone, oxidizing by contacting oxygen-containing gas with said 2-ethylanthrahydroquinone dissolved in said ethyl benzoate, and then extracting the hydrogen peroxide, produced in the oxidation, with water, the ethyl benzoate being employed in admixture with dibutylether of diethylene glycol, the latter being present in a minor amount by volume with respect to the benzoate.

11. A method of preparing hydrogen peroxide which comprises dissolving 2-ethylanthraquinone in isobutyl benzoate, hydrogenating with hydrogen to 2-ethylanthrahydroquinone, oxidizing by contacting oxygen-containing gas with said 2-ethylanthrahydroquinone dissolved in said isobutyl benzoate, and then extracting the hydrogen peroxide, produced in the oxidation, with water.

12. A method of preparing hydrogen peroxide which comprises dissolving 2-ethylanthraquinone in isobutyl benzoate, hydrogenating with hydrogen to 2-ethylanthrahydroquinone, oxidizing by contacting oxygen-containing gas with said 2-ethylanthrahydroquinone dissolved in said isobutyl benzoate, and then extracting the hydrogen peroxide, produced in the oxidation, with water, the isobutyl benzoate being employed in admixture with alpha-methyl-naphthalene, the latter being present in a minor amount by volume with respect to the benzoate.

13. A method of preparing hydrogen peroxide which comprises dissolving 2-ethylanthraquinone in ethyl benzoate, hydrogenating with hydrogen to 2-ethylanthrahydroquinone, oxidizing by contacting oxygen-containing gas with said 2-ethylanthrahydroquinone dissolved in said ethyl benzoate, and then extracting the hydrogen peroxide, produced in the oxidation, with water, the ethyl benzoate being employed in admixture with dibutyl ether of ethylene glycol, the latter being present in a minor amount by volume with respect to the benzoate.

References Cited in the file of this patent

UNITED STATES PATENTS

| 2,059,569 | Filson et al. | Nov. 3, 1936 |
| 2,158,525 | Riedl et al. | May 16, 1939 |
| 2,455,238 | Dawsey | Nov. 30, 1948 |
| 2,660,580 | Von | Nov. 24, 1953 |
| 2,791,491 | Hack et al. | May 7, 1957 |

FOREIGN PATENTS

| 531,403 | Belgium | Feb. 25, 1955 |